(12) United States Patent
Karabinis

(10) Patent No.: US 6,785,543 B2
(45) Date of Patent: Aug. 31, 2004

(54) FILTERS FOR COMBINED RADIOTELEPHONE/GPS TERMINALS

(75) Inventor: Peter D. Karabinis, Cary, NC (US)

(73) Assignee: Mobile Satellite Ventures, LP, Reston, VA (US)

( * ) Notice: Subject to any disclaimer, the term of this patent is extended or adjusted under 35 U.S.C. 154(b) by 71 days.

(21) Appl. No.: 10/353,548

(22) Filed: Jan. 29, 2003

(65) Prior Publication Data

US 2003/0143949 A1 Jul. 31, 2003

Related U.S. Application Data

(63) Continuation-in-part of application No. 10/074,097, filed on Feb. 12, 2002, now Pat. No. 6,684,057.
(60) Provisional application No. 60/393,191, filed on Jul. 2, 2002, and provisional application No. 60/322,240, filed on Sep. 14, 2001.

(51) Int. Cl.[7] .................................................. H04Q 7/20
(52) U.S. Cl. ...................... 455/427; 455/12.1; 455/13.5; 455/63.3
(58) Field of Search ............................... 455/12.1, 13.5, 455/427, 63.3, 428, 429, 63.1, 63.2, 435.1, 436; 342/357.06, 352, 355

(56) References Cited

U.S. PATENT DOCUMENTS

| 5,303,286 | A | | 4/1994 | Wiedeman |
| 5,432,780 | A | | 7/1995 | Smith et al. |
| 5,761,605 | A | | 6/1998 | Tawil et al. |
| 5,850,602 | A | * | 12/1998 | Tisdale et al. ............... 455/430 |
| 5,937,332 | A | | 8/1999 | Karabinis |
| 6,023,606 | A | * | 2/2000 | Monte et al. ............... 455/13.1 |
| 6,169,878 | B1 | | 1/2001 | Tawil et al. |
| 6,272,325 | B1 | * | 8/2001 | Wiedeman et al. ......... 455/117 |
| 6,311,074 | B1 | | 10/2001 | Luders |
| 6,654,357 | B1 | * | 11/2003 | Wiedeman ................... 370/315 |

OTHER PUBLICATIONS

Global Positioning System Overview http://www.colorado.edu/geography/gcraft/notes/gps/gps.html revised May 1, 2000 (first published in Sep. 1994).

* cited by examiner

Primary Examiner—Nay Maung
Assistant Examiner—Edan Orgad
(74) Attorney, Agent, or Firm—Myers Bigel Sibley & Sajovec

(57) ABSTRACT

A satellite radiotelephone system includes a space-based component, a plurality of ancillary terrestrial components, and a plurality of radiotelephones. The space-based component is configured to provide wireless radiotelephone communications using satellite radiotelephone frequencies. The plurality of ancillary terrestrial components include a plurality of ancillary terrestrial component antennas configured to provide wireless radiotelephone communications using at least one of the satellite radiotelephone frequencies in a radiation pattern that increases radiation below the horizon compared to above the horizon. The plurality of radiotelephones are configured to communicate with the space-based component and with the plurality of ancillary terrestrial components. Each radiotelephone also includes a GPS signal processor and a GPS mode filter that is configured to suppress energy at $(1575.42-\Delta)$ MHz, where $0<\Delta\leq16.42$ MHz. Related radiotelephones and methods are also discussed.

39 Claims, 14 Drawing Sheets

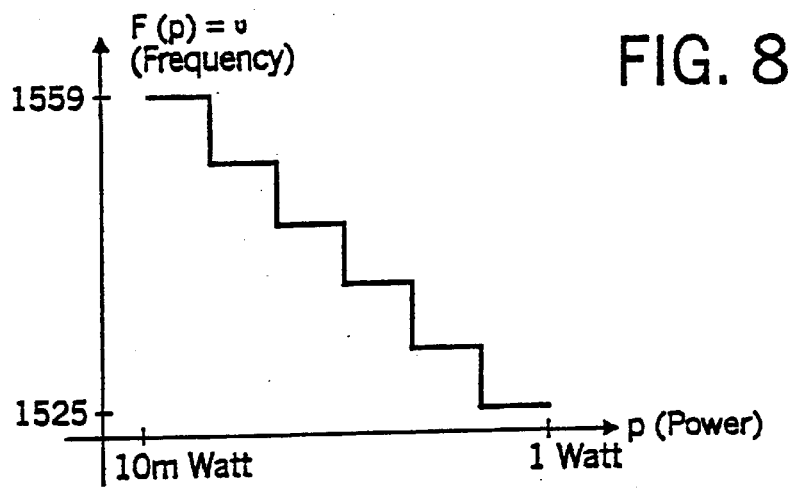
FIG. 8
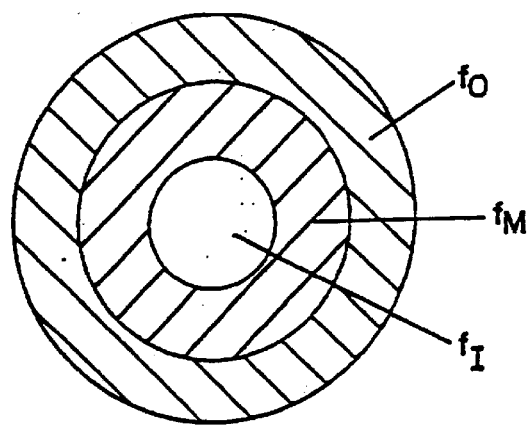
FIG. 9
FIG. 10
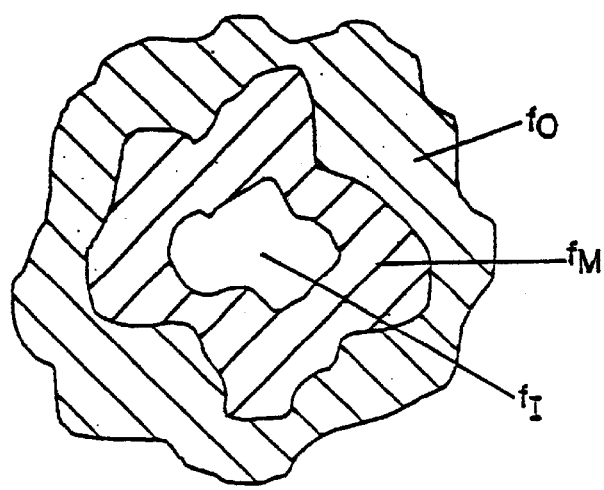

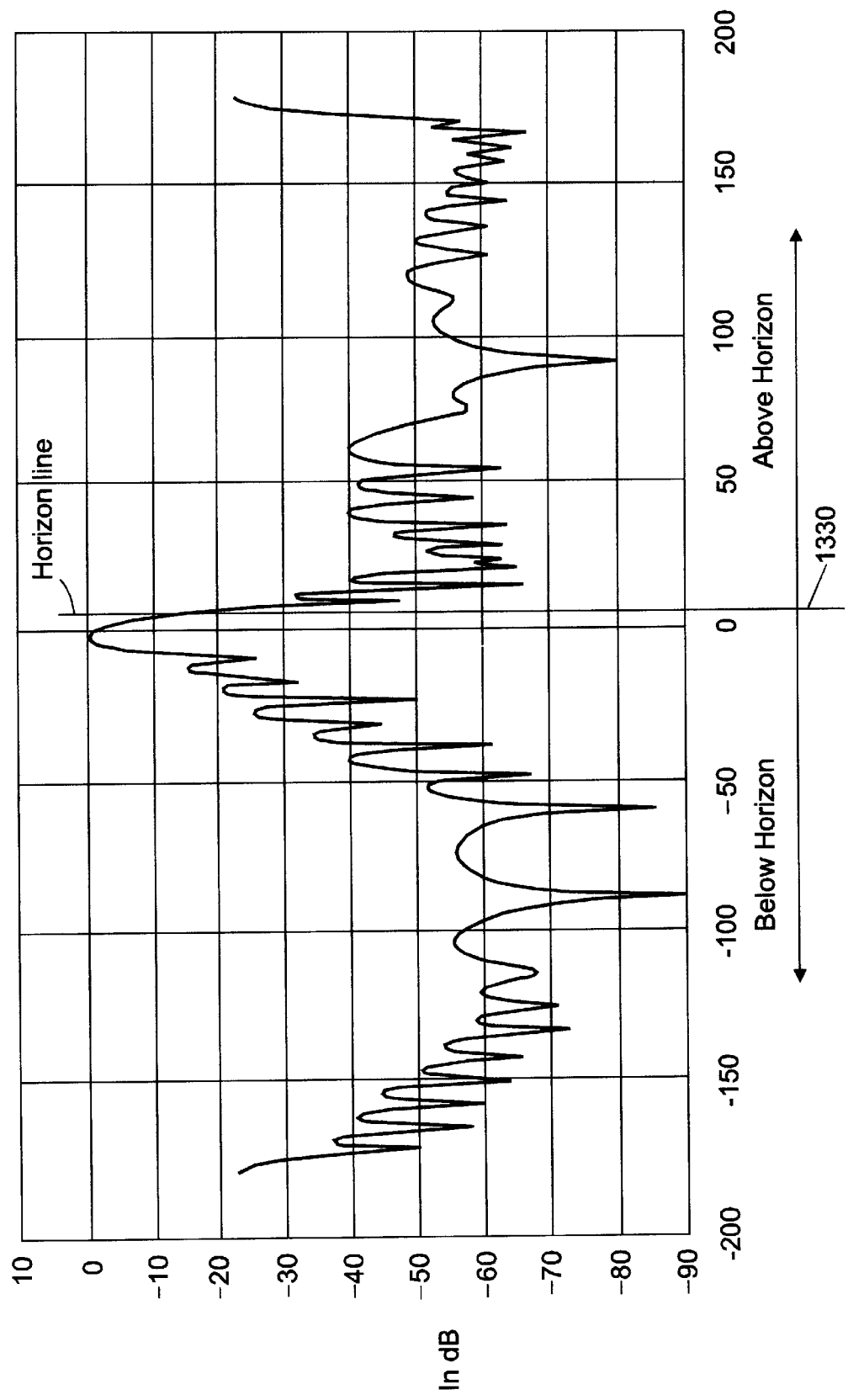

FILTERS FOR COMBINED RADIOTELEPHONE/GPS TERMINALS

CROSS-REFERENCE TO PROVISIONAL APPLICATION

This application claims the benefit of priority from provisional Application No. 60/393,191, filed Jul. 2, 2002, entitled Filters For Combined Satellite Radiotelephone/GPS Terminals. In addition, this application claims the benefit of priority as a continuation-in-part application from regular U.S. application Ser. No. 10/074,097, filed Feb. 12, 2002, which is now U.S. Pat. No. 6,684,057 entitled Systems and Methods for Terretrial Reuse of Cellular Satellite Frequency Spectrum, which claims the benefit of priority from provisional Application No. 60/322,240, filed Sep. 14, 2001, entitled Systems and Methods for Terrestrial Re-Use of Mobile Satellite Spectrum. Each of these applications is assigned to the assignee of the present application, and the disclosures of each of these applications are hereby incorporated herein by reference in their entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

As is well known to those having skill in the art, terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

One example of terrestrial reuse of satellite frequencies is described in U.S. Pat. No. 5,937,332 to the present inventor Karabinis entitled *Satellite Telecommunications Repeaters and Retransmission Methods*, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

According to embodiments of the present invention, a satellite radiotelephone system can include a space-based component, a plurality of ancillary terrestrial components, and a plurality of radiotelephones. The space-based component can be configured to provide wireless radiotelephone communications using satellite radiotelephone frequencies. The plurality of ancillary terrestrial components can include a plurality of ancillary terrestrial component antennas configured to provide wireless radiotelephone communications using at least one of the satellite radiotelephone frequencies in a radiation pattern that increases radiation below the horizon compared to above the horizon. The plurality of radiotelephones can be configured to communicate with the space-based component and with the plurality of ancillary terrestrial components, and the radiotelephones can also include a GPS signal receiver/processor and a GPS mode filter configured to selectively suppress energy at and/or below (1575.42−Δ) MHz, where 0<Δ≦16.42 MHz.

The GPS mode filter can be configured to suppress at least 10 dB of energy for at least one value of Δ. More particularly, the GPS mode filter can be configured to selectively suppress at least 10 dB of energy at and/or below (1575.42−Δ) MHz. The GPS mode filter can be further configured to suppress energy at frequencies less than (1575.42−Δ) MHz, and Δ can be greater than at least 1 MHz. Accordingly, the GPS mode filter can be a high pass filter.

In addition, the radiotelephones can be further configured to suppress processing of GPS signals during intervals of time when actively communicating with the space-based component and/or one of the ancillary terrestrial components. The wireless radiotelephone communications can be processed without being subjected to the GPS mode filter.

The satellite radiotelephone frequencies can include a satellite downlink frequency band and a satellite uplink frequency band and GPS signals can be transmitted from GPS satellites over a GPS frequency band between the satellite downlink and uplink frequency bands. More particularly, the satellite downlink frequency band can include frequencies between 1525 MHz and 1559 MHz, and the satellite uplink frequency band can include frequencies between 1626.5 MHz and 1660.5 MHz. The GPS frequency band can include frequencies between 1559 MHz and 1605 MHz.

According to additional embodiments of the present invention, a radiotelephone can include a radio front end, a signal processor, and a GPS mode filter. The radio front end can be configured to provide wireless radiotelephone communications with a space-based component using satellite radiotelephone frequencies, to provide wireless radiotelephone communications with a plurality of ancillary terrestrial components using at least one of the satellite radiotelephone frequencies, and to receive global positioning satellite (GPS) signals from a plurality of global positioning satellites. The signal processor can be configured to determine a measure of location of the radiotelephone using GPS signals received at the radio front end when providing GPS mode operations and to process communications that are received at and/or transmitted from the radio front end when providing wireless radiotelephone communications. The GPS mode filter can be coupled between the radio front end and the signal processor and configured to filter GPS signals from the radio front end before being provided to the signal processor. More particularly, the GPS mode filter can be configured to suppress energy at and/or below (1575.42−Δ) MHz, where 0<Δ≦16.42 MHz, and Δ can be greater than at least 1 MHz.

According to particular embodiments, wireless radiotelephone communications are not subjected to the GPS mode filter. The GPS mode filter can be configured to suppress at least 10 dB of energy at and/or below (1575.42−Δ) MHz, and the GPS mode filter can be more particularly configured to suppress at least 10 dB of energy at (1575.42−Δ) MHz and at frequencies less than (1575.42−Δ) MHz. Accordingly, the GPS mode filter can be a high pass filter. Processing of GPS signals at the signal processor can be suppressed when actively providing radiotelephone communications with the space-based component and/or one of the ancillary terrestrial components.

The satellite radiotelephone frequencies can include a satellite downlink frequency band and a satellite uplink frequency band and GPS signals can be transmitted from GPS satellites over a GPS frequency band between the satellite downlink and uplink frequency bands. More particularly, the satellite downlink frequency band can include frequencies between 1525 MHz and 1559 MHz, and the satellite uplink frequency band can include frequencies between 1626.5 MHz and 1660.5 MHz. The GPS frequency band can include frequencies between 1559 MHz and 1605 MHz.

According to still additional embodiments of the present invention, satellite radiotelephone communications can be provided at a radiotelephone comprising a radio front end that is configured to provide wireless radiotelephone communications with a space-based component using satellite radiotelephone frequencies, that is configured to provide wireless radiotelephone communications with a plurality of ancillary terrestrial components using at least one of the satellite radiotelephone frequencies, and that is configured to receive global positioning satellite (GPS) signals from a plurality of Global positioning satellites. Energy can be suppressed at and/or below (1575.42−Δ) MHz for GPS signals received from the radio front end (where 0<Δ≦16.42 MHz) during GPS mode operations, and a measure of location of the radiotelephone can be determined using the GPS signals having suppressed energy at (1575.42−Δ) MHz during GPS mode operations. During wireless radiotelephone communications, communications that are received at and/or transmitted from the radio front end can be processed. More particularly, Δ can be greater than at least 1 MHz.

Processing communications that are received at and/or transmitted from the radio front end during wireless radiotelephone communications can include processing the communications without suppressing energy of the communications at and/or below (1575.42−Δ) MHz. In addition, suppressing energy at and/or below (1575.42−Δ) MHz can include suppressing at least 10 dB of energy at and/or below (1575.42−Δ) MHz. More particularly, suppressing energy at (1575.42−Δ) MHz can include suppressing at least 10 dB of energy at frequencies or (1575.42−Δ) MHz and lower. Moreover, processing of GPS signals can be suppressed when actively providing radiotelephone communications with the space-based component and/or one of the ancillary terrestrial components.

The satellite radiotelephone frequencies can include a satellite downlink frequency band and a satellite uplink frequency band and GPS signals can be transmitted from GPS satellites over a GPS frequency band between the satellite downlink and uplink frequency bands. More particularly, the satellite downlink frequency band can include frequencies between 1525 MHz and 1559 MHz, and the satellite uplink frequency band can include frequencies between 1626.5 MHz and 1660.5 MHz. The GPS frequency band can include frequencies between 1559 MHz and 1605 MHz.

BRIEF DESCRIPTION OF THE DRAWINGS

FIG. 8 graphically illustrates mapping of monotonically decreasing power levels to frequencies according to embodiments of the present invention.

FIG. 9 illustrates an ideal cell that is mapped to three power regions and three associated carrier frequencies according to embodiments of the invention.

FIG. 10 depicts a realistic cell that is mapped to three power regions and three associated carrier frequencies according to embodiments of the invention.

FIG. 15 graphically illustrates radiation of an antenna of an ancillary terrestrial component according to some embodiments of the present invention.

DETAILED DESCRIPTION

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
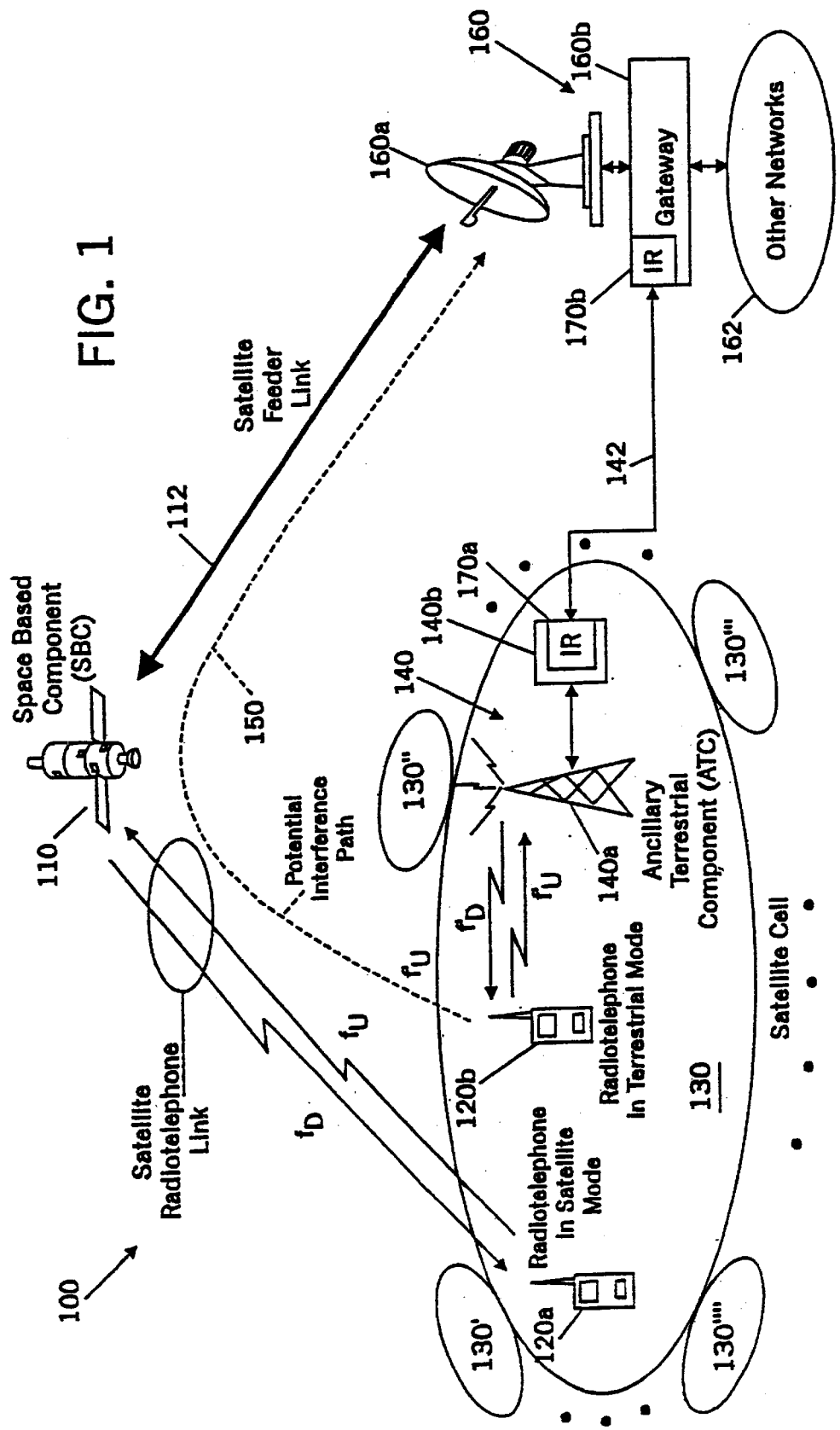
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130–130"" over one or more satellite radiotelephone forward link (downlink) frequencies $f_D$. The space-based component 110 is configured to receive wireless communications from, for example, a first radiotelephone 120a in the satellite radiotelephone cell 130 over a satellite radiotelephone return link (uplink) frequency $f_U$. An ancillary terrestrial network, comprising at least one ancillary terrestrial component 140, which may include an antenna 140a and an electronics system 140b (for example, at least one antenna 140a and at least one electronics system 140b), is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U = f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f'_U$. The interference reducer 170a and/or 170b uses the wireless communications $f'_U$ that are intended for the ancillary terrestrial component 140 from the second radiotelephone 120b in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120b at $f'_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as the demodulated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency $f_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
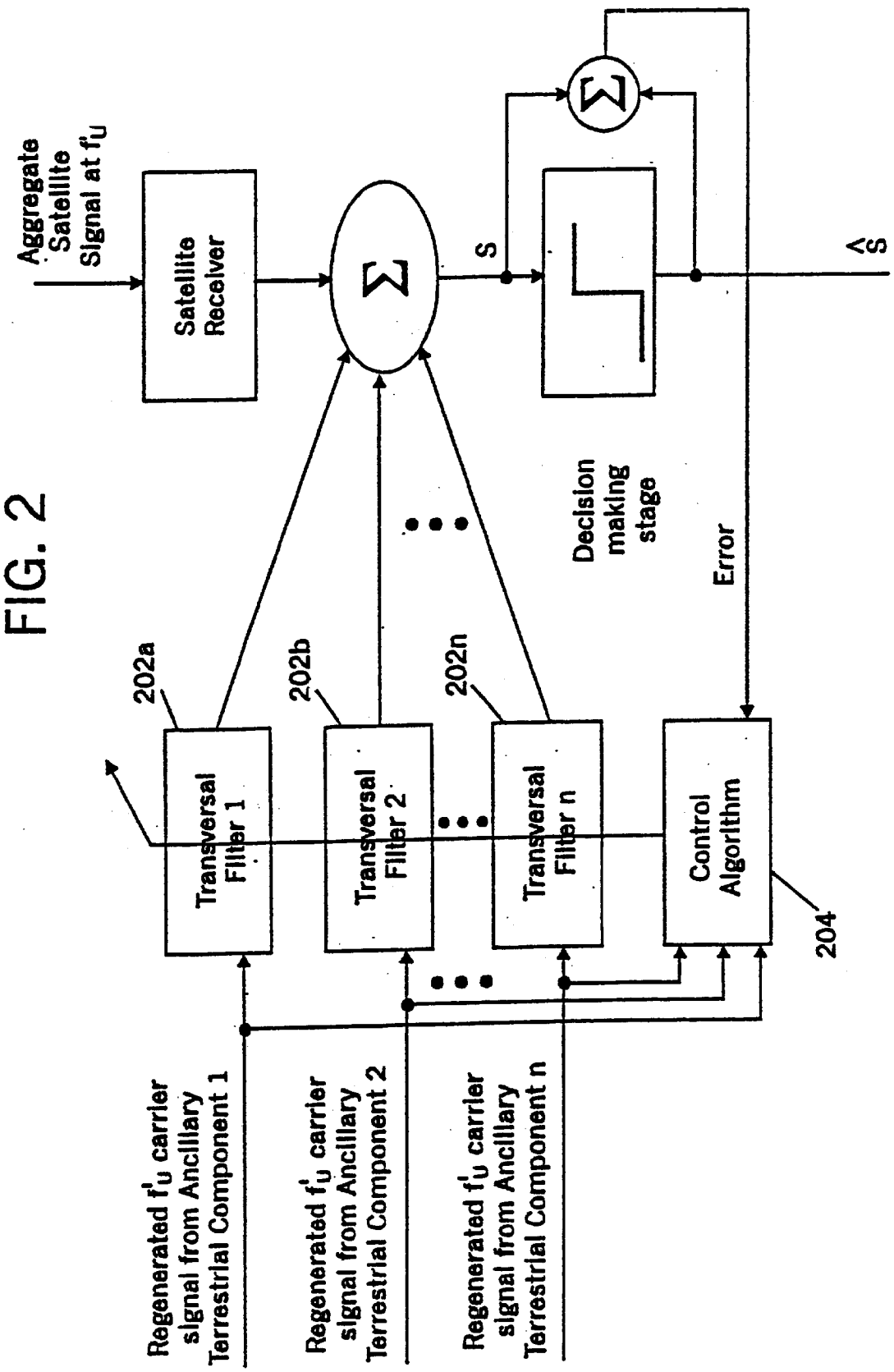
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a–202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
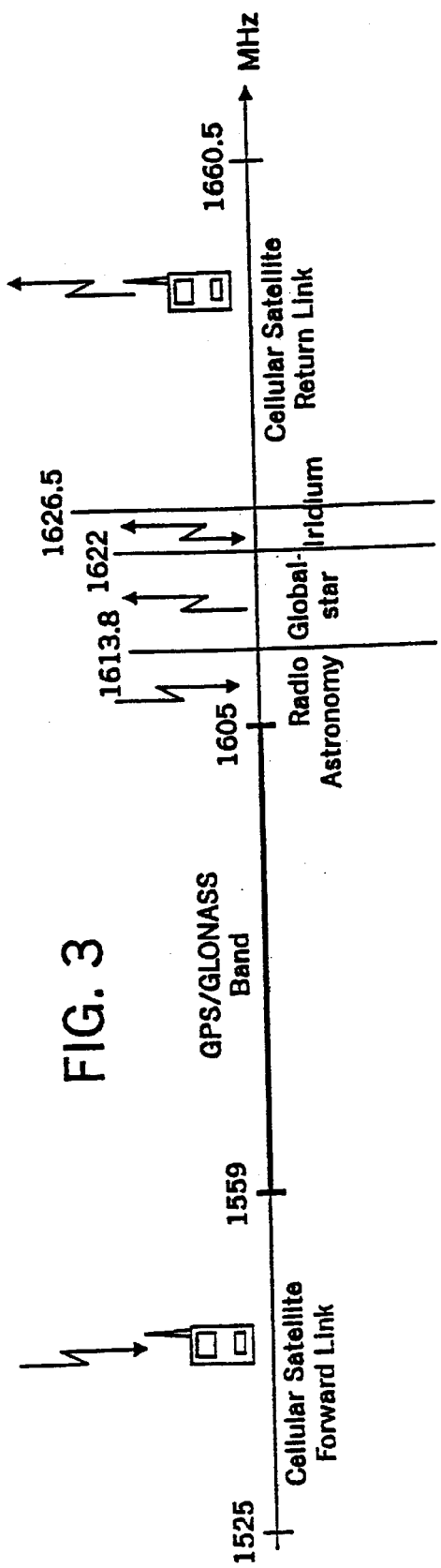
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4–12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time division duplex frequency to transmit wireless communications to the radiotelephones and to receive wireless communications from the radiotelephones at different times. In particular, in some embodiments, the at least one time division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time Division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
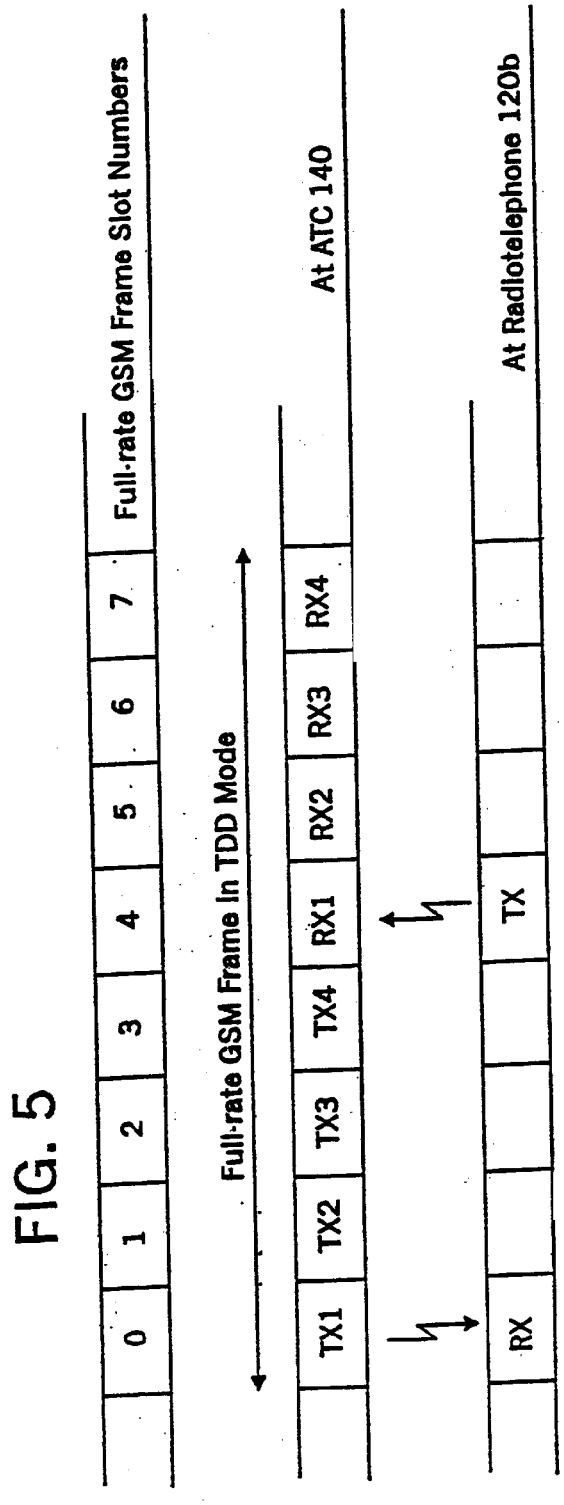
FIG. 5 illustrates time division duplex frame structures according to embodiments of the present invention.
Figure 4:
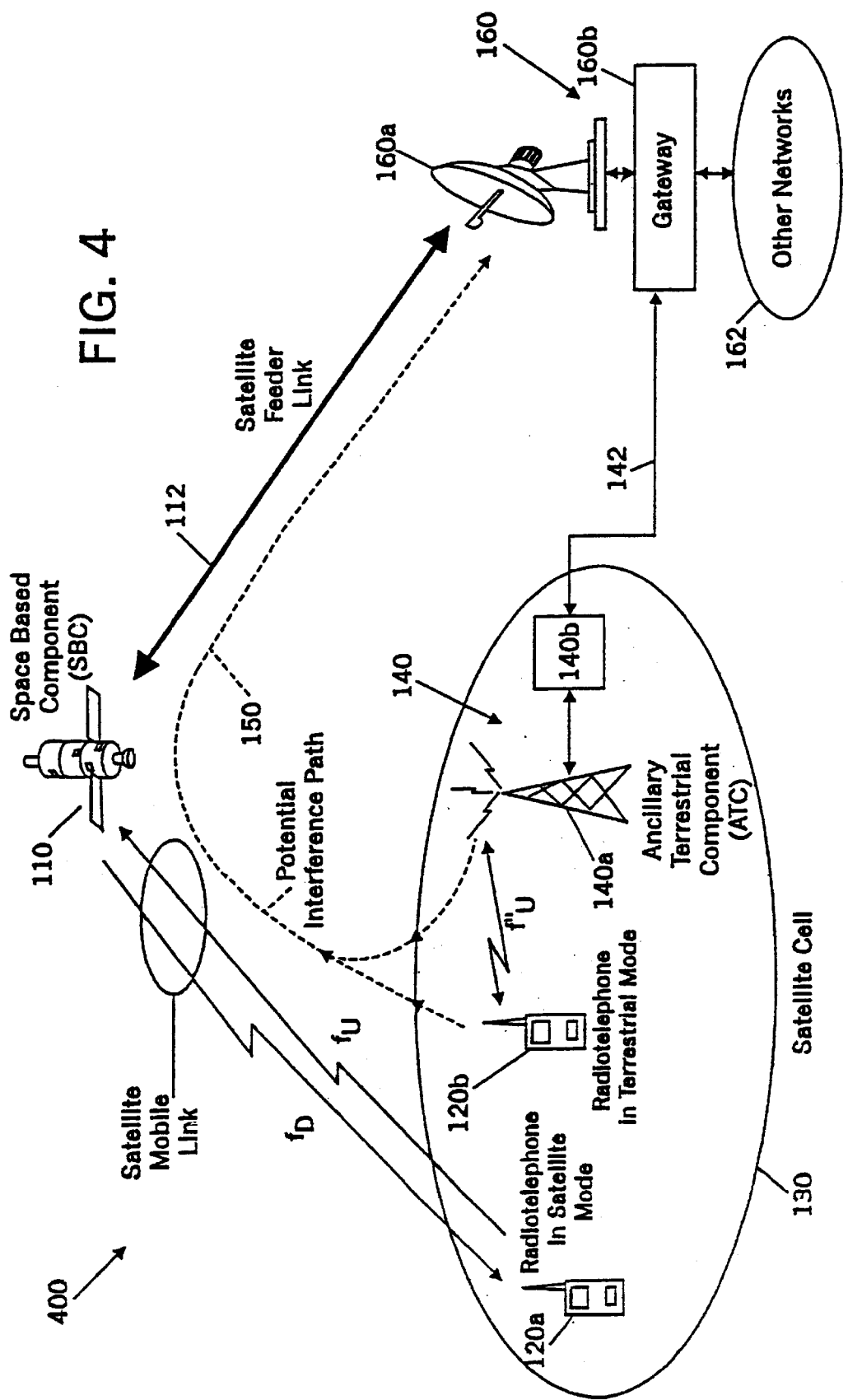
FIG. 4 is a schematic diagram of cellular satellite systems and methods according to other embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier frame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence, driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation/protocol and the GPRS modulation/protocol are well known to those having skill in the art, and need not be described further herein. Given an EDGE forward/GPRS return TDD carrier strategy, up to (384/2)=192 kbps may be supported on the forward link while on the return link the radiotelephone may transmit at up to (115/2)≈64 kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to (384)(6/8)=288 kbps may be achieved on the forward link, with up to (115)(2/8)≈32 kbps on the return link.

Figure 6:
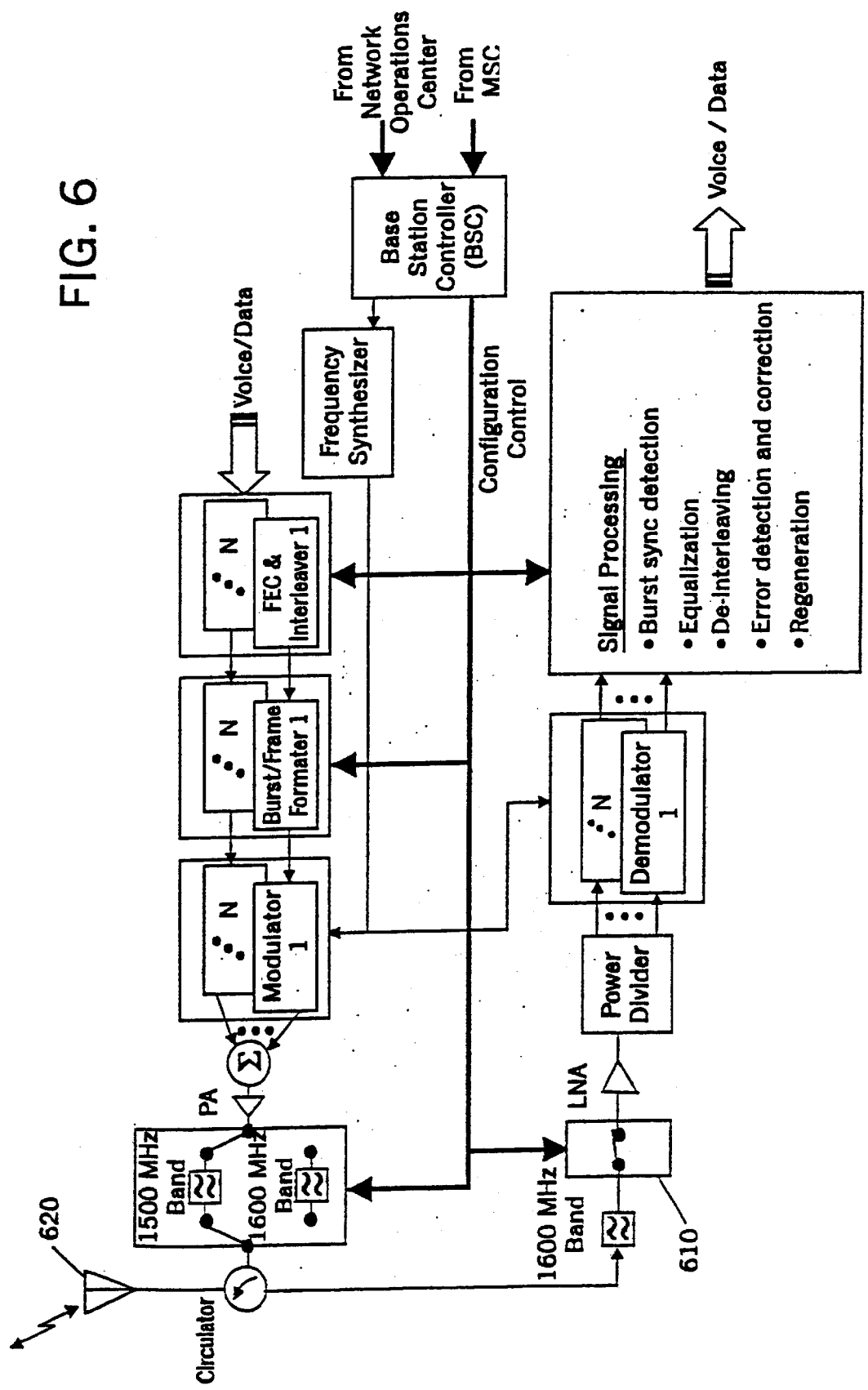
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140a of FIGS. 1 and 4, and the remainder of FIG. 6 can correspond to the electronics system 140b of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
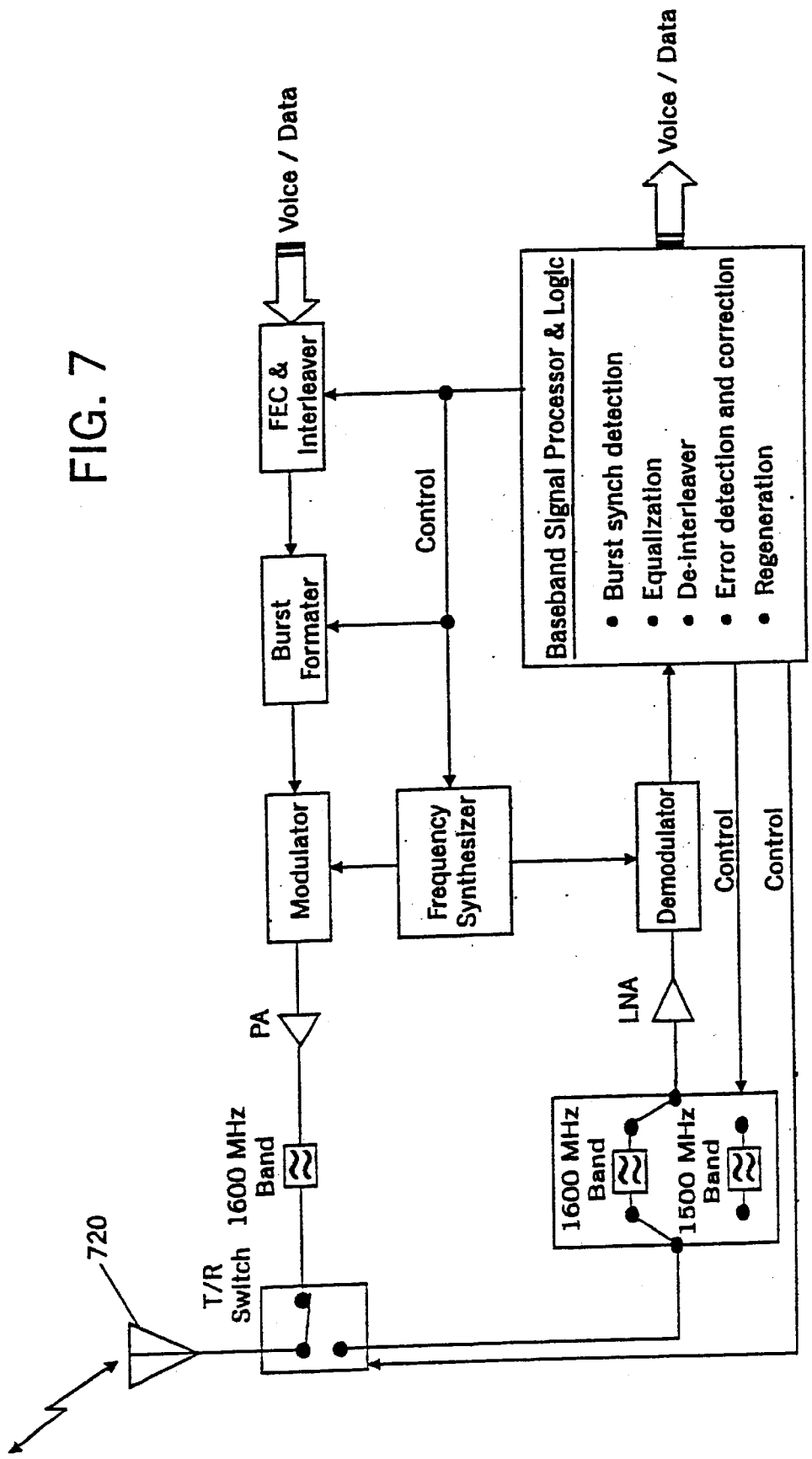
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described. Referring to FIG. 8, let $v=\mathcal{F}(\rho)$ represent a mapping from the power ($\rho$) domain to the frequency ($v$) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency ($v$) is the satellite carrier frequency that the ATC uses to communicate with the radiotelephone. According to embodiments of the invention, the mapping $\mathcal{F}$ is a monotonically decreasing function of the independent variable $\rho$. Consequently, in some embodiments, as the maximum ATC power increases, the carrier frequency that the ATC uses to establish and/or maintain the communications link decreases. FIG. 8 illustrates an embodiment of a piece-wise continuous monotonically decreasing (stair-case) function. Other monotonic functions may be used, including linear and/or nonlinear, constant and/or variable decreases.

FACCH or Slow Associated Control CHannel (SACCH) messaging may be used in embodiments of the invention to facilitate the mapping adaptively and in substantially real time.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $F_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
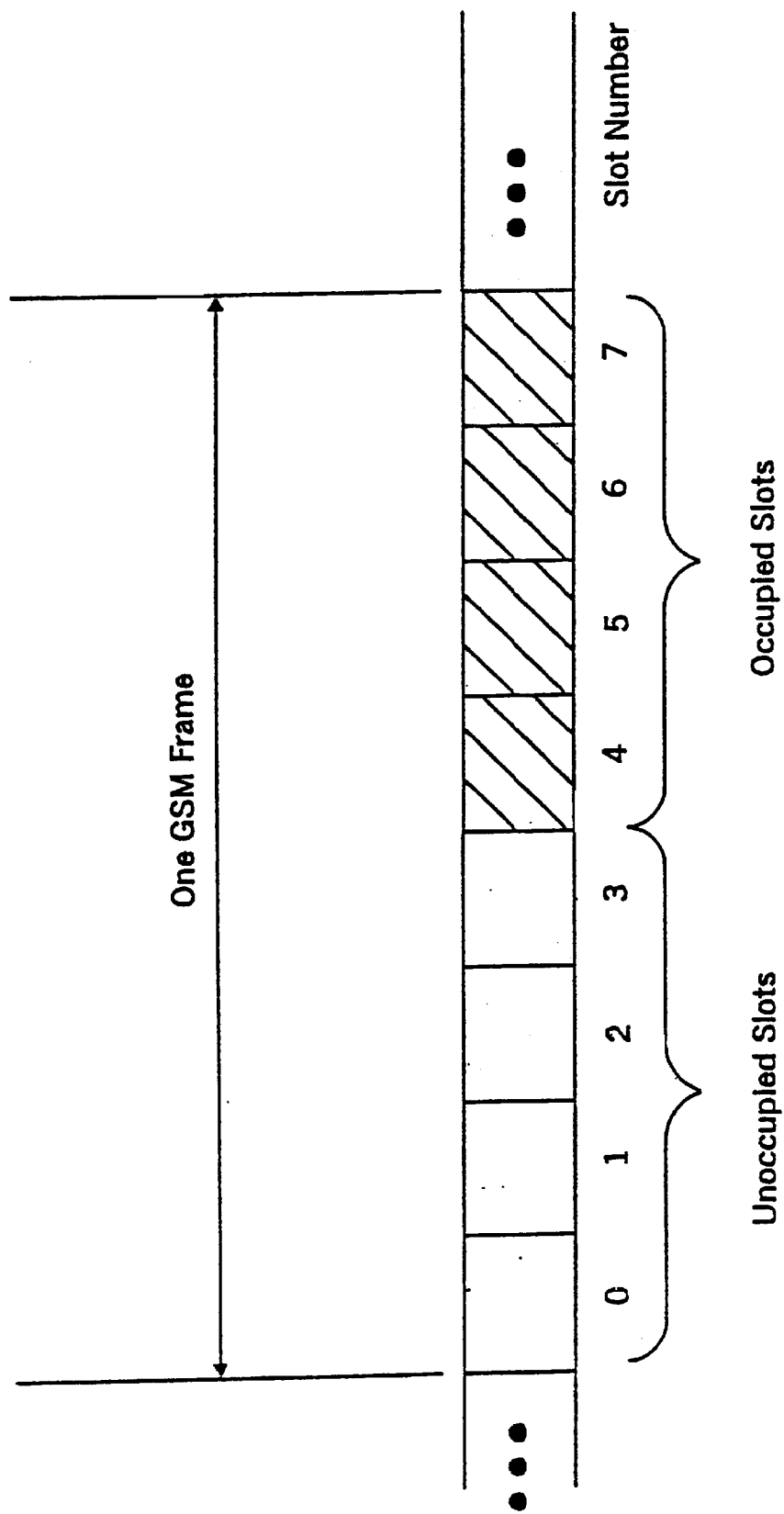
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4–7) being used and four contiguous slots (0–3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient clean information so as to "flywheel" through the error events.

According to other embodiments of the invention, embodiments of FIGS. 8–10 can be combined with embodiments of FIG. 11. Furthermore, according to other embodiments of the invention, if an $f_I$ carrier of FIG. 9 or 10 is underutilized, because of the relatively small footprint of the inner-most region of the cell, it may be used to support additional traffic over the much larger outermost region of the cell.

Figure 12:
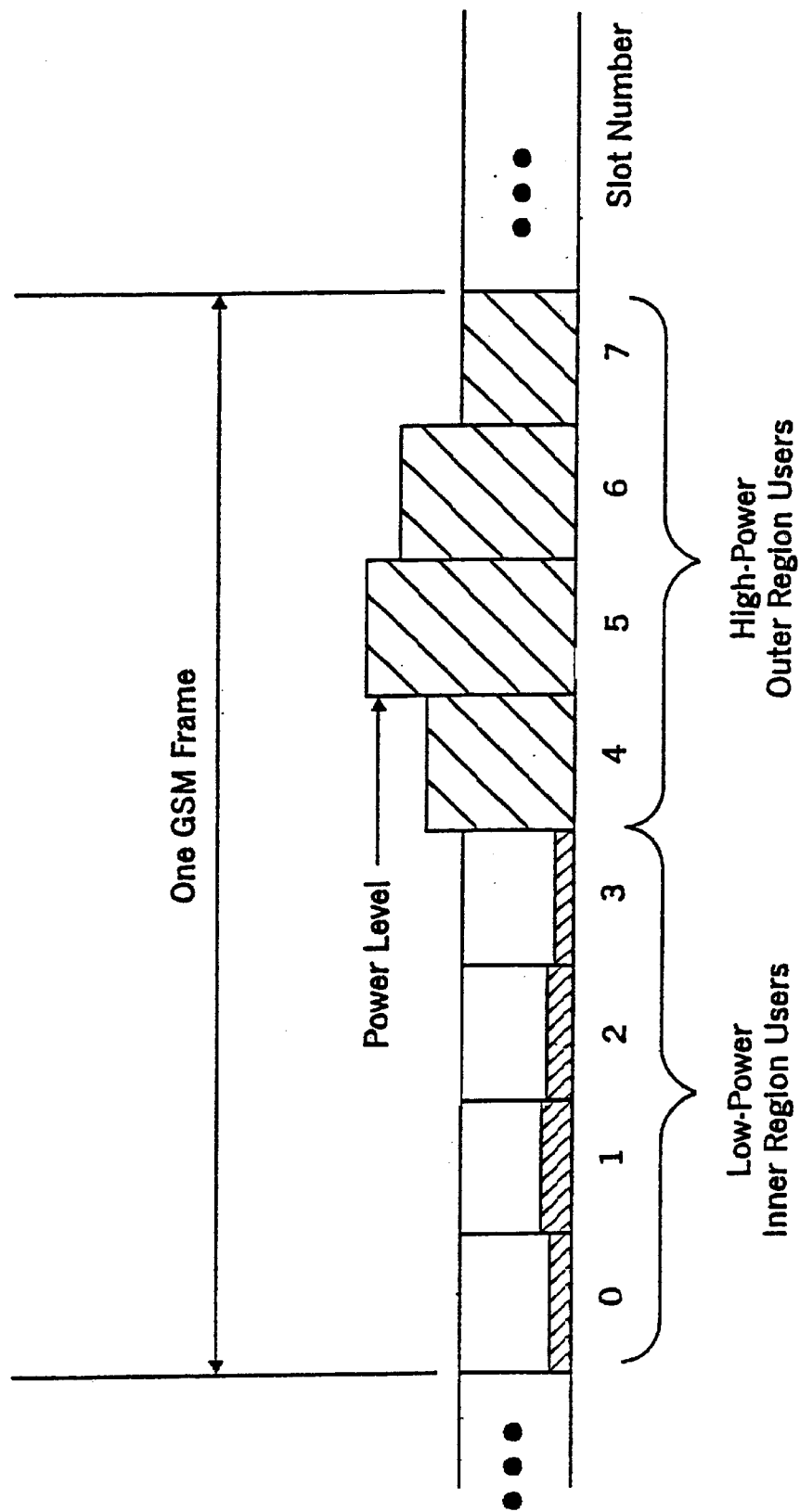
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8–10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to underpopulate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per carrier that may be aimed at a particular user, may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11–12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIG. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

Filters for Combined Radiotelephone/GPS Terminals

As was described above, some embodiments of the present invention may employ a Space-Based Network (SBN) and an Ancillary Terrestrial Network (ATN) that both communicate with a plurality of radiotelephones using satellite radiotelephone frequencies. The SBN may include one or more Space-Based Components (SBC) and one or more satellite gateways. The ATN may include a plurality of Ancillary Terrestrial Components (ATC). In some embodiments, the SBN and the ATN may operate at L-band (1525–1559 MHz forward service link, and 1626.5–1660.5 MHz return service link). Moreover, in some embodiments, the radiotelephones may be similar to conventional handheld cellular/PCS-type terminals that are capable of voice and/or packet data services. In some embodiments, terrestrial reuse of at least some of the mobile satellite frequency spectrum can allow the SBN to serve low density areas that may be impractical and/or uneconomical to serve via conventional terrestrial networks, while allowing the ATN to serve pockets of densely populated areas that may only be effectively served terrestrially. The radiotelephones can be attractive, feature-rich and/or low cost, similar to conventional cellular/PCS-type terminals that are offered by terrestrial-only operators. Moreover, by operating the SBN and ATN modes over the same frequency band, component count in the radiotelephones, for example in the front end radio frequency (RF) section, may be reduced. In particular, in some embodiments, the same frequency synthesizer, RF filters, low noise amplifiers, power amplifiers and antenna elements may be used for terrestrial and satellite communications.

In some embodiments, the radiotelephones also can include a GPS signal receiver and/or GPS signal processor. Moreover, as was shown in FIG. 3, since the radiotelephone forward and return links and the GPS band occupy nearby portions of the satellite frequency spectrum, the GPS signal receiver that may be built into the radiotelephone also may share common components with the radiotelephone.

Embodiments of the present invention that will now be described can reduce or eliminate performance degradation that may take place in a radiotelephone that is combined with a GPS signal receiver. In particular, referring to FIG. 13, an antenna 140a of an ancillary terrestrial component is illustrated. In some embodiments of the invention, radiation by the antenna 140a may be directed downward to below the horizon, to provide more useful radiation to radiotelephones 1320. Radiotelephones 1320 may be similar to the radiotelephones 120 that were described above, except that a GPS signal receiver and/or GPS signal processor also may be included, as will be described below.

Figure 13:
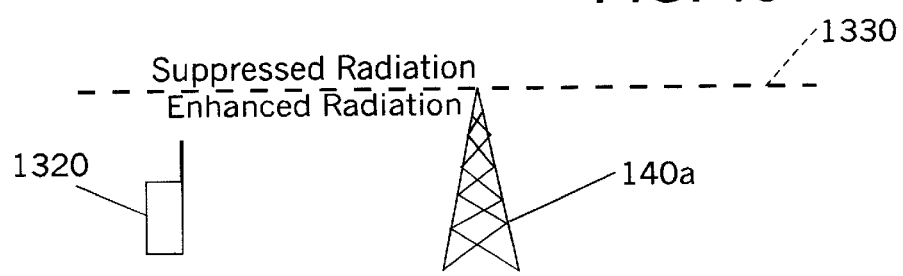
FIG. 13 is a schematic representation of an antenna of an ancillary terrestrial component according to some embodiments of the present invention.
Figure 14:
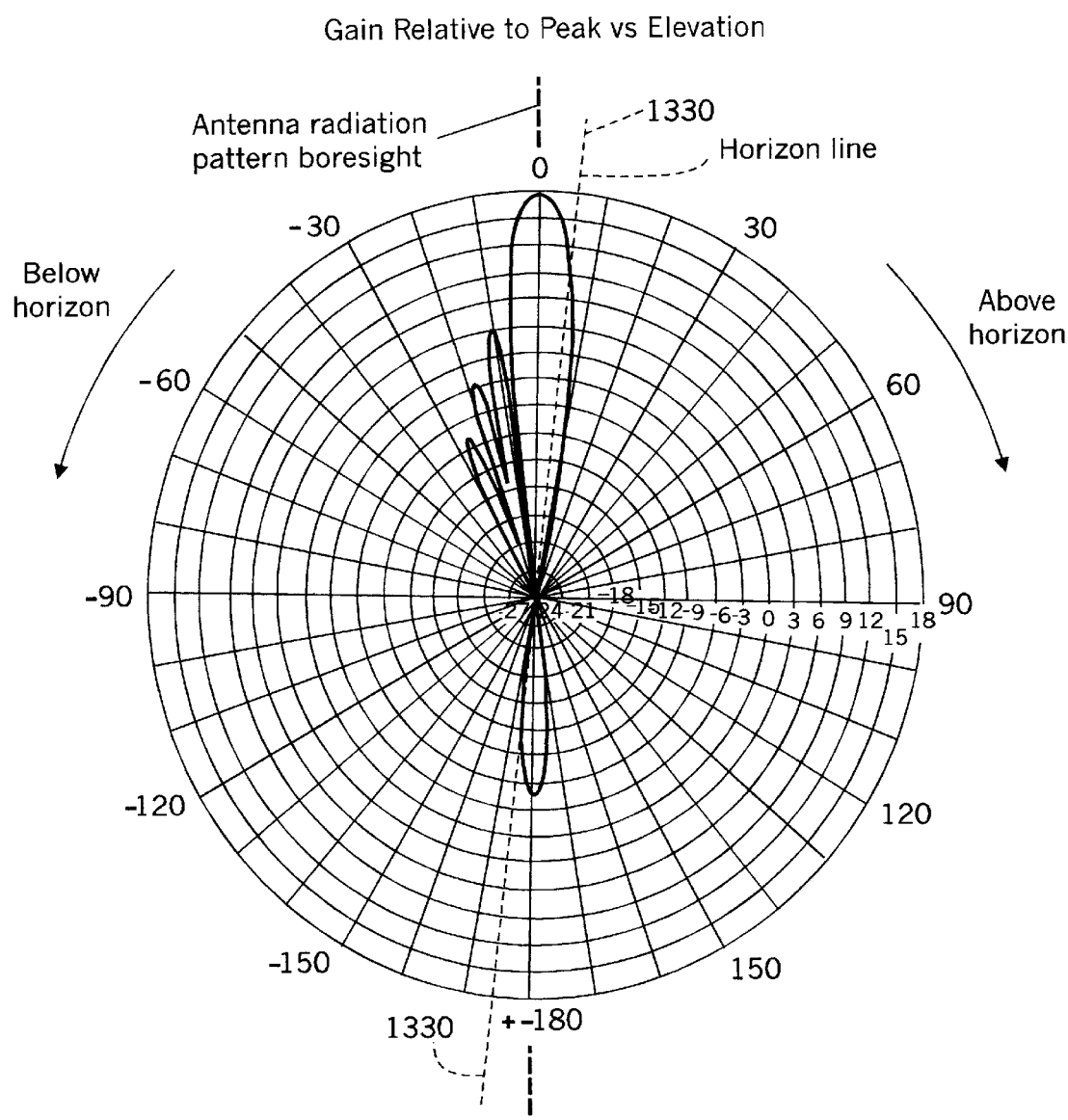
FIG. 14 is a polar chart that illustrates radiation patterns of an antenna of an ancillary terrestrial component according to some embodiments of the present invention.

Thus, referring to FIG. 13, the asymmetrical radiation pattern of the antenna 140a generates enhanced radiation below the horizon 1330, and suppressed or reduced radiation above the horizon 1330. This pattern of enhanced radiation below the horizon and suppressed radiation above the horizon may be obtained by antenna down-tilt, and/or antenna beam forming, and/or other techniques that can provide asymmetrical radiation patterns relative to the horizon, as shown in the polar chart of FIG. 14, and in the gain versus elevation graph of FIG. 15. In FIG. 14, the horizon is indicated by the line 1330, and the antenna radiation pattern boresight is directed along the line extending from the origin to 0 degrees. Below the horizon is indicated in the general direction of −90° to the left of line 1330, and above the horizon is indicated in the general direction of +90° to the right of line 1330.

As shown in FIG. 14, antenna pattern side lobes may be suppressed or reduced above the horizon and enhanced below the horizon. Stated differently, the radiation pattern of the antenna 140a is directed downward to enhance the amount of radiation that is received by a radiotelephone 1320 and/or to reduce the amount of airborne radiation which may potentially interfere with airborne communications systems.

It has been found, according to some embodiments of the present invention, that the enhanced downward directed radiation that is provided by the antenna 140a may impact the GPS signal receiver and/or GPS signal processing that may be included in radiotelephone 1320. Accordingly, in some embodiments of the invention, a GPS mode filter may be provided in the front end of the radiotelephone 1320 preferably before a Low Noise Amplifier (LNA) that provides amplification to the GPS signal.

Figure 16:
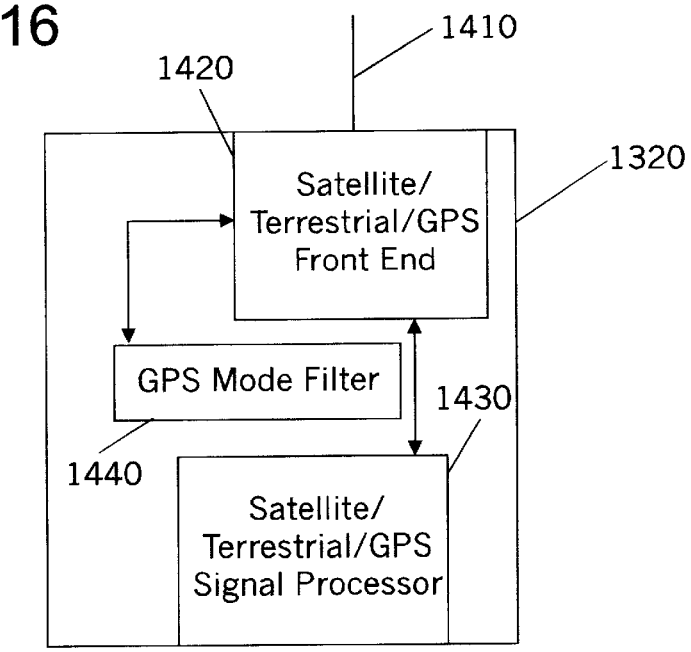
FIG. 16 is a block diagram of a radiotelephone including a GPS signal receiver according to some embodiments of the present invention.

FIG. 16 is a block diagram of a radiotelephone 1320 that includes a GPS signal receiver and/or GPS signal processor according to some embodiments of the present invention. In these embodiments, a common antenna 1410 may be provided for satellite and terrestrial transmission and reception and for GPS signal reception. It will be understood, however, that the antenna 1410 also may include elements that are used only for satellite, terrestrial or GPS. As also shown in FIG. 16, a single satellite/terrestrial/GPS front end 1420 may be provided for radio frequency processing of the satellite, terrestrial and GPS signals. It also will be understood that, although a single front end may be provided to reduce component count, there may be some components that are provided exclusively for terrestrial, satellite and/or GPS use. As also shown in FIG. 16, a single satellite/terrestrial/GPS signal processor 1430 also may be provided. It will be understood, however, that some separate signal processing portions also may be provided to allow for unique requirements for satellite, terrestrial and/or GPS processing.

Still referring to FIG. 16, a GPS mode filter 1440 may be provided. This filter 1440 may be a high pass, bandpass, notch and/or other filter that can attenuate selected frequencies. According to some embodiments of the present invention, the GPS mode filter 1440 is a high pass filter that is operative to selectively suppress energy at and/or below $(1575.42-\Delta)$ MHz, where $0<\Delta\leq16.42$ MHz. This high pass filter may thereby prevent, reduce or minimize the effect of the radiation of the antenna 140a when radiotelephone 1320 is receiving GPS signals. Stated in other words, the GPS mode filter may be operative to selectively suppress energy at frequencies at and/or below $(1575.42-\Delta)$ MHz, where $0<\Delta\leq16.42$ MHz, and to selectively pass energy at frequencies greater than $(1575.42-\Delta)$ MHz.

Figure 17:
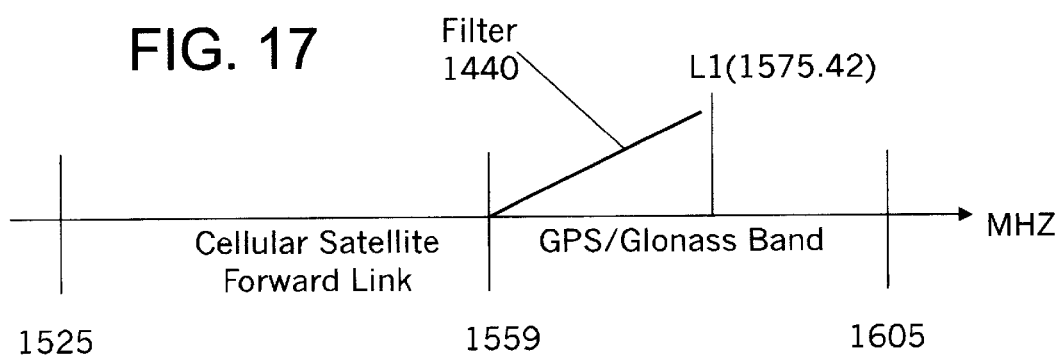
FIG. 17 is a spectrum diagram that illustrates operation of a filter according to some embodiments of the present invention.

In particular, referring to FIG. 17, a spectrum diagram that illustrates satellite L-band frequency allocations is shown. As shown, the cellular satellite forward link may be provided at frequencies between 1525 MHz and 1559 MHz. The GPS/GLONASS band may be between 1559 MHz and 1605 MHz. In particular, the GPS L1 frequency that carries the navigation message and the code signals for civilian GPS may be centered at 1575.42 MHz, and civilian GPS signals may be provided at 1575.42 MHz±1 MHz. As shown in FIG. 17, the GPS mode filter 1440 such as a high pass filter may have a high pass filter slope that allows the L1 frequency to pass substantially unattenuated, but that attenuates frequencies that are lower than the L1 frequency. It will be understood that the slope, cut off point and/or bandwidth of the filter 1440 may be designed based on the particular environment in which the radiotelephone 1320 is being operated, the RF characteristics of the front end, the RF characteristics of the antenna 1410 and/or other factors. In some embodiments, the energy is suppressed by at least 10 dB by filter 1440 for at least one value of $\Delta$. The design of filters is well known to those having skill in the art and need not be described further herein.

Filters according to some embodiments of the present invention thereby can allow a combined radiotelephone/GPS terminal to effectively receive and/or process GPS signals while eliminating, minimizing or reducing the impact to the front end and/or other stages of the combined radiotelephone/GPS terminal due to the enhanced terrestrial radiation that may be provided by the ancillary terrestrial network.

Figure 18:
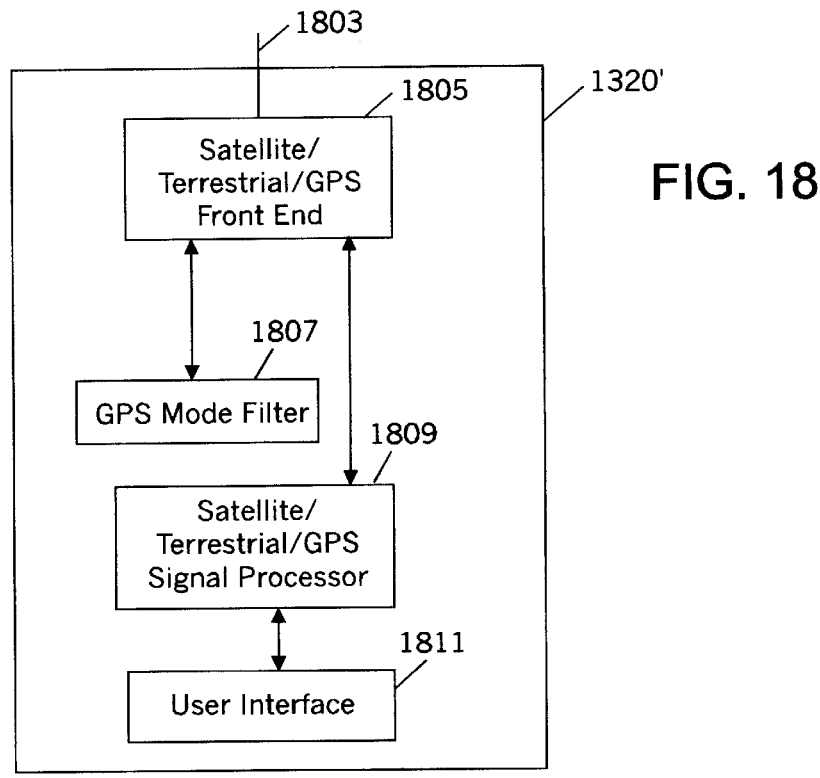
FIGS. 18–21 are block diagrams of radiotelephones including GPS signal receivers according to additional embodiments of the present invention.
Figure 19:
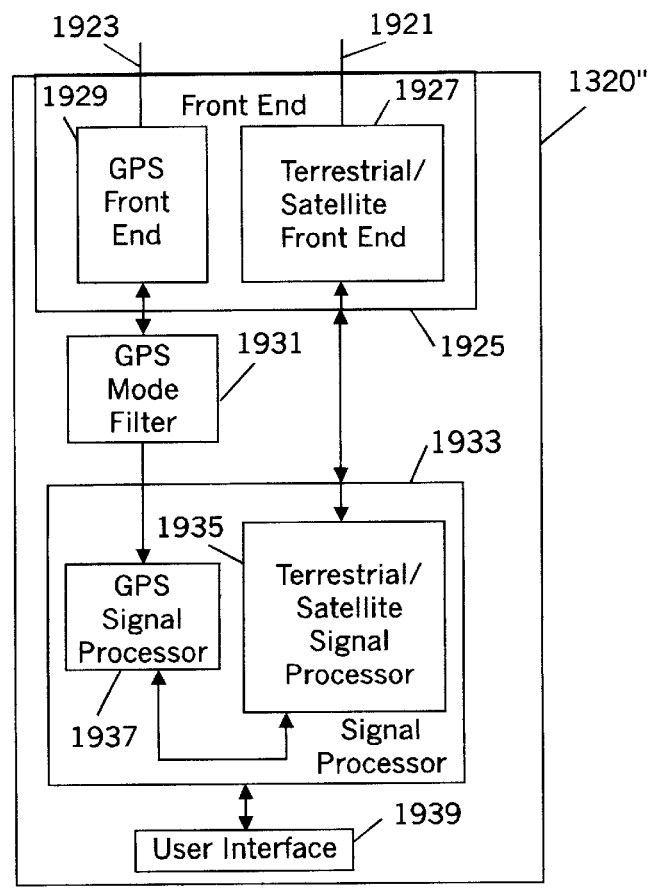

Additional radiotelephones according to other embodiments of the present invention are illustrated in FIGS. 18 and 19. As shown in FIG. 18, a radiotelephone 1320' according to additional embodiments of the present invention can include a single satellite/terrestrial/GPS antenna 1803, a single satellite/terrestrial/GPS front end 1805, a GPS mode filter 1807, a single satellite/terrestrial/GPS signal processor 1809, and a user interface 1811. While a single antenna, a single front end, and a single signal processor are shown as providing both GPS and satellite/terrestrial communications functionalities, each of these elements may include portions thereof dedicated to GPS functionality and/or satellite/terrestrial communications functionality.

The radio front end 1805 can be configured to provide wireless radiotelephone communications with a space-based component using satellite radiotelephone frequencies and to provide wireless radiotelephone communications with an ancillary terrestrial component using at least one of the satellite radiotelephone frequencies. The radio front end can be further configured to receive global positioning satellite (GPS) signals from a plurality of global positioning satellites. The signal processor 1809 can be configured to determine a measure of location of the radiotelephone using GPS signals received at the radio front end when providing GPS mode operations and to process communications that are received at and/or transmitted by the radio front end when providing wireless radiotelephone communications.

Multiple antenna segments may be provided, and/or the antenna 1803 may include elements that are used only for satellite, terrestrial, or GPS. In addition, by operating the SBN and ATN modes over the same frequency bands, component count in the radiotelephones, for example in the front end 1805, may be reduced. In particular, in some embodiments, the same frequency synthesizer, RF filters, low noise amplifiers, power amplifiers and antenna elements may be used for terrestrial and satellite communications, and/or some components may be provided exclusively for terrestrial, satellite, or GPS use. In addition, the signal processor may include different portions of hardware and/or software directed to the different functionalities and/or different signal processing tasks.

When the radiotelephone is operating to provide GPS mode operations, GPS signals are received through the antenna 1803, the single satellite/terrestrial/GPS front end 1805, and the GPS mode filter 1807, and/or provided to the satellite/terrestrial/GPS signal processor 1809. The single satellite/terrestrial/GPS signal processor 1809 processes the GPS signals and may provide a global positioning output measure at the user interface 1811. The user interface 1811, for example, can include a liquid crystal display that can provide a visual indication of position such as a map and/or an alphanumeric indication of location such as a longitude and latitude. The user interface 1811 can also include a speaker and microphone for radiotelephone communications, and/or a user input such as a keypad or a touch sensitive screen.

As discussed above with respect to the GPS mode filter 1440 of FIG. 16, the GPS mode filter 1807 may be a high pass, bandpass, notch and/or other filter that can attenuate selected frequencies. As discussed above with respect to FIGS. 3 and 17, cellular satellite forward service links (down link frequency band) may be provided at frequencies between 1525 MHz and 1559 MHz, cellular satellite return service links (uplink frequency band) can be provided at frequencies between 1626.5 MHz and 1660.5 MHz, and the GPS/GLONASS band can be provided between 1559 MHz and 1605 MHz. More particularly, the GPS L1 frequency that carries the navigation message and code signals for civilian GPS use is substantially located at 1575.42+/−1 MHz. Accordingly, the GPS mode filter 1807 can be a high pass filter having a high pass filter slope that allows the L1 frequency to pass relatively unattenuated, but that selectively attenuates frequencies that are lower than the L1 frequency. It will be understood that the slope, cut off point and/or bandwidth of the filter 1807 may be designed based on a particular environment in which the radiotelephone 1320' is being operated, the RF characteristics of the front end, the RF characteristics of the antenna 1803, and/or other factors.

Accordingly, the GPS mode filter 1807 can be configured to selectively suppress energy at and/or below (1575.42−$\Delta$) MHz, where 0<$\Delta$<16.42 MHz. Moreover, the GPS mode filter can be configured to selectively suppress at least 10 dB of energy at and/or below (1575.42−$\Delta$) MHz. The GPS mode filter can be further configured to selectively suppress at least 10 dB of energy at frequencies of (1575.42−$\Delta$) MHz and lower.

According to some embodiments of the present invention, the GPS mode filter 1807 can be operative to selectively pass energy having a frequency of 1575.42+/−1 MHz and to selectively attenuate energy having a frequency of less than or equal to (1575.42−$\Delta$) MHz, where 0<$\Delta$<16.42 MHz. More particularly, the energy can be suppressed by at least 10 dB for frequencies less than or equal to (1575.42−$\Delta$) MHz, and $\Delta$ can be greater than at least 1 MHz. Accordingly, GPS signals can be received while eliminating, minimizing, and/or reducing the impact to the front end and other sections of the combined satellite/terrestrial/GPS radiotelephone due to enhanced radiation in the cellular satellite forward link frequency band that may be provided by the ancillary terrestrial network.

Processing of GPS signals can be suppressed at the front end 1805 and/or at the signal processor 1809 when actively providing satellite/terrestrial communications. The bidirectional coupling between the common satellite/terrestrial/GPS front end 1805 and the satellite/terrestrial/GPS signal processor 1809 facilitates two way communications such as a radiotelephone conversation and/or sending and receiving e-mails or other data, so that wireless radiotelephone communications are not subjected to the GPS mode filter.

The common satellite/terrestrial/GPS front end 1805 can be coupled to a communications input or satellite/terrestrial/GPS signal processor 1809 to provide communications system signal monitoring during GPS operations, such as control signals. Accordingly, an incoming call page can be received at the front end 1805 and processed at signal processor 1809 during GPS operations. In the alternative, a switch may be provided to select either GPS signals or communications system signals for coupling to and processing at the satellite/terrestrial/GPS signal processor. Moreover, the GPS mode filter can be implemented as an analog and/or digital filter.

As shown in the example of FIG. 19, a radiotelephone 1320" according to yet additional embodiments of the present invention can include a front end 1925 with a common satellite/terrestrial front end portion 1927 and a GPS front end portion 1929 respectively coupled to a satellite/terrestrial antenna 1921 and a GPS antenna 1923. The radiotelephone 1320" can also include a signal processor 1933 having a GPS signal processor portion 1937 and a satellite/terrestrial processor portion 1935, and the signal processor 1933 can be coupled with a user interface 1939. A GPS mode filter 1931 can be inserted preferably between the GPS antenna 1923 and a GPS Low Noise Amplifier (LNA) of the GPS front end 1929. The satellite/terrestrial front end portion 1927 can be directly coupled with the satellite/terrestrial signal processor portion 1935.

The GPS front end portion 1929 can be configured to receive global positioning satellite (GPS) signals from a plurality of global positioning satellites. The common terrestrial/satellite front end portion 1927 can be configured to provide wireless radiotelephone communications with a space-based component using satellite radiotelephone frequencies and to provide wireless radiotelephone communications with an ancillary terrestrial component using at least one of the satellite radiotelephone frequencies. The GPS signal processor portion 1937 can be configured to determine a measure of location of the radiotelephone using GPS signals received at the GPS front end portion 1929 when providing GPS mode operations. The common terrestrial/satellite signal processor portion 1935 can be configured to process communications that are received at and/or transmitted from the common terrestrial/satellite front end portion 1927 when providing wireless radiotelephone communications.

The GPS signal processor 1937 may communicate bidirectionally with the terrestrial/satellite signal processor 1935 to receive and/or relay information from/to the terrestrial/satellite signal processor 1935, and/or the ATN, and/or the SBN. Such information may indicate points in time where measure(s) of position of radiotelephone 1320" may be determined by GPS signal processor 1937, or value(s) of position measures of radiotelephone 1320" that have been determined by GPS signal processor 1937 and/or being relayed to the SBN and/or the ATN.

The radiotelephone 1320" of FIG. 19 is similar to the radiotelephone 1320' of FIG. 18 with the exception that FIG. 19 shows separate GPS and terrestrial/satellite portions of the front end 1925 and the signal processor 1933, and separate GPS and satellite/terrestrial antennas 1923 and 1921. By operating the SBN and ATN modes over the same frequency band, component count in the radiotelephones, for example in the common terrestrial/satellite front end portion 1927, may be reduced. In particular, in some embodiments, the same frequency synthesizer, RF filters, low noise amplifiers, power amplifiers and antenna elements may be used for terrestrial and satellite communications.

The GPS front end portion 1929 and the common terrestrial/satellite front end portion 1927 may share one or more common components, and the two front end portions may have separate couplings to a single antenna instead of two separate antennas as shown. As shown, there may be some components that are provided exclusively for terrestrial, satellite, or GPS use. The GPS signal processor portion 1937 and the satellite/terrestrial signal processor portion 1935 may have separate hardware and/or software portions and/or operate in whole or in part in different physical portions of one or more processors.

When the radiotelephone 1320" is operating to provide GPS mode operations, GPS signals can be received through the antenna 1923 and the GPS front end portion 1929 and provided to the GPS signal processor portion 1937 through a coupling with the GPS mode filter 1931. The GPS signal processor portion 1937 can process the GPS signals and may provide a global positioning output at the user interface 1939 in response to a user command and/or information received from the SBN and/or ATN. The user interface 1939, for example, can include a liquid crystal display that can provide a visual indication of position such as a map and/or an alphanumeric indication of location such as a longitude and latitude. The user interface can also include a speaker and microphone for radiotelephone communications, and/or a user input such as a keypad or a touch sensitive screen.

As discussed above with respect to the GPS mode filter 1440 of FIG. 16 and the GPS mode filter 1807 of FIG. 18, the GPS mode filter 1931 may be a high pass, bandpass, notch and/or other filter that can attenuate selected frequencies. As discussed above with respect to FIGS. 3 and 17, cellular satellite and ATC forward links may be provided at frequencies between 1525 MHz and 1559 MHz, and the GPS/GLONASS band is provided between 1559 MHz and 1605 MHz. More particularly, the GPS L1 frequency that carries the navigation message and code signals for civilian GPS use is located at 1575.42+/−1 MHz. Accordingly, the GPS mode filter 1931 can be a high pass filter having a high pass filter slope that allows the L1 frequency to pass relatively unattenuated, but that attenuates frequencies that are lower than the L1 frequency. It will be understood that the slope, cut off frequency and/or bandwidth of the filter 1931 may be designed based on a particular environment in which the radiotelephone 1320" is being operated, the RF characteristics of the front end, the RF characteristics of the antenna 1923, and/or other factors such as radiation patterns of ATC antennas.

Accordingly, the GPS mode filter 1931 can be configured to selectively suppress energy at frequencies at and/or below (1575.42−$\Delta$) MHz, where 0<$\Delta$<16.42 MHz. Moreover, the GPS mode filter can be configured to selectively suppress at least 10 dB of energy at frequencies at and/or below (1575.42−$\Delta$) MHz. The GPS mode filter can be further configured to selectively suppress at least 10 dB of energy at frequencies of (1575.42−$\Delta$) MHz and lower.

According to some embodiments of the present invention, the GPS mode filter 1931 can be operative to substantially pass energy having a frequency of 1575.42+/−1 MHz and to selectively attenuate energy having a frequency of less than (1575.42−$\Delta$) MHz, where 0<$\Delta$<16.42 MHz. More particularly, the energy can be selectively suppressed by at least 10 dB for frequencies of (1575.42−$\Delta$) MHz and lower, and $\Delta$ can be greater than at least 1 MHz. Accordingly, GPS signals can be received while eliminating, minimizing, or reducing the impact to the front end of the combined satellite/terrestrial/GPS radiotelephone due to enhanced radiation in the cellular satellite forward link frequency band that may be provided by the ancillary terrestrial network.

Processing of GPS mode signals can be suppressed at the GPS front end portion 1929 and/or the GPS signal processor portion 1937 when actively providing satellite/terrestrial communications and more particularly when transmitting satellite/terrestrial communications from the radiotelephone 1320". The bi-directional coupling between the satellite/terrestrial front end portion 1927 and the terrestrial/satellite signal processor 1935 may facilitate two way communications such as a radiotelephone conversation and/or sending and receiving e-mails or other data, so that wireless radiotelephone communications are not subjected to the GPS mode filter.

Moreover, the satellite/terrestrial front end portion 1927 and the satellite/terrestrial signal processor portion 1935 may provide reception of communications system signals, such as control signals received over control channels, during GPS operations. Accordingly, an incoming call page can be received at the terrestrial/satellite front end 1927 and processed at the terrestrial/satellite signal processor 1935 during GPS operations, for example, to provide an indication of an incoming call.

According to additional embodiments of the present invention, a radiotelephone can include a radio front end configured to provide wireless radiotelephone communications with a space-based component using satellite radiotelephone frequencies and to provide wireless radiotelephone communications with a plurality of ancillary terrestrial components using at least one of the satellite radiotelephone frequencies. The radio front end can also be configured to receive global positioning satellite (GPS) signals from a plurality of global positioning satellites. During GPS mode operations, received energy can be selectivley suppressed at frequencies at and/or below (1575.42−$\Delta$) MHz, where 0<$\Delta$≦16.42 MHz, and a measure of location of the radiotelephone can be determined using the GPS signals having suppressed energy at and/or below (1575.42−$\Delta$) MHz. During wireless radiotelephone communications, communications received at and transmitted from the radio front end can be processed. During wireless radiotelephone communications, the wireless radiotelephone communications can be processed without significantly suppressing energy of the communications at and/or below (1575.42−$\Delta$) MHz.

During GPS mode operations, selectively suppressing energy at and/or below (1575.42−$\Delta$) MHz can include selectively suppressing at least 10 dB of energy at (1575.42−$\Delta$) MHz and at frequencies less than (1575.42−$\Delta$) MHz. During wireless radiotelephone communications, processing of GPS signals can be suppressed when actively providing radiotelephone communications with the space-based component and/or one of the ancillary terrestrial components.

The satellite radiotelephone frequencies can include a satellite downlink frequency band and a satellite uplink frequency band and GPS signals can be transmitted from GPS satellites over a GPS frequency band between the satellite downlink and uplink frequency bands. More particularly, the satellite downlink frequency band can include frequencies between 1525 MHz and 1559 MHz, and the satellite uplink frequency band can include frequencies between 1626.5 MHz and 1660.5 MHz. The GPS frequency band can include frequencies between 1559 MHz and 1605 MHz. Moreover, when suppressing energy at and/or below (1575.42−Δ) MHz, Δ can be greater than at least 1 MHz. In addition, an incoming call page can be received during GPS mode operations, and the incoming call page can be processed during GPS operations.

Figure 20:
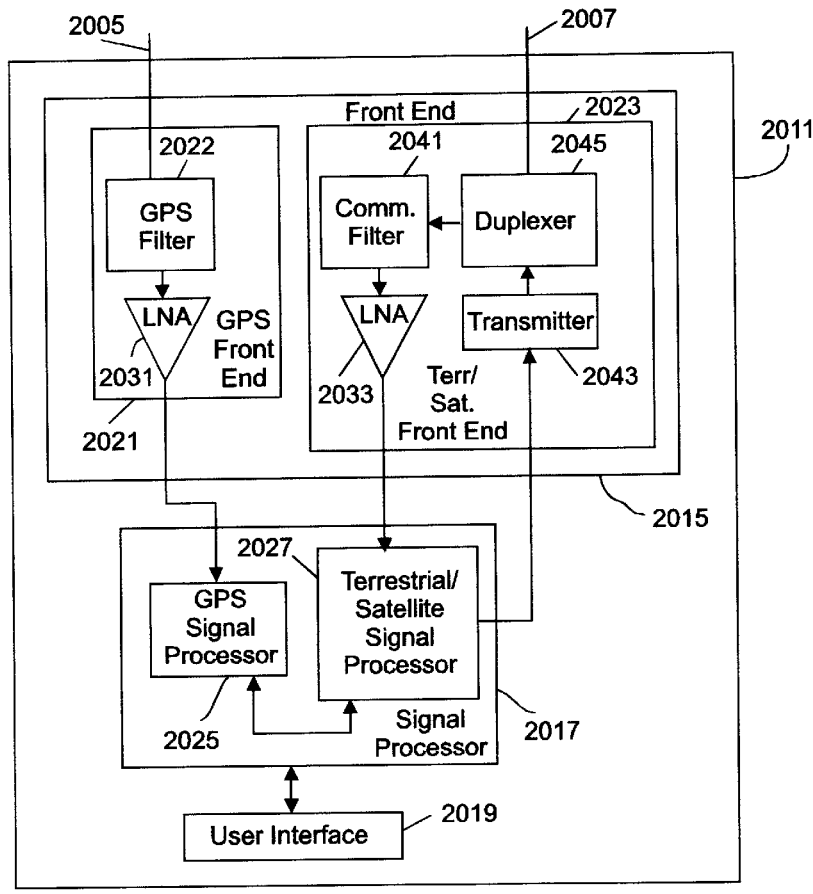

FIG. 20 illustrates radiotelephones according to yet additional embodiments of the present invention. As shown, a radiotelephone 2011 can include a front end 2015, a signal processor 2017, a GPS antenna 2005, a terrestrial/satellite antenna 2007, and a user interface 2019. More particularly, the front end 2015 can include a GPS front end portion 2021 and a terrestrial/satellite front end portion 2023, and the signal processor 2017 can include a GPS signal processor portion 2025 and a terrestrial/satellite signal processor portion 2027.

According to embodiments illustrated in FIG. 20, a first low noise amplifier 2031 can be provided in the GPS front end portion 2021, and a second low noise amplifier 2033 can be provided in the terrestrial/satellite front end portion 2023. Accordingly, GPS signals can be received through GPS antenna 2005, the GPS filter 2022, and the GPS low noise amplifier 2031, and provided to the GPS signal processor portion 2025 of the signal processor 2017. The GPS signal processor portion 2025 can thus generate a measure of location of the radiotelephone 2011, and a measure of location can be provided to a user of the radiotelephone via user interface 2019. A coupling between the GPS signal processor portion 2025 and the terrestrial/satellite signal processor portion 2027 can also be provided so that a measure of location of the radiotelephone can be transmitted to an SBN and/or ATN and/or so that commands or other information from an SBN and/or ATN can be provided to the GPS signal processor portion 2025.

During GPS mode operations, the GPS filter 2022 of GPS front end portion 2021 can selectively suppress energy received at frequencies at and/or below (1575.42−Δ) MHz, where 0<Δ≦16.42 MHz, and a measure of location of the radiotelephone can be determined using the GPS signals having suppressed energy at and/or below (1575.42−Δ) MHz. During GPS mode operations, selectively suppressing energy at and/or below (1575.42−Δ) MHz can include selectively suppressing at least 10 dB of energy at (1575.42−Δ) MHz and at frequencies less than (1575.42−Δ) MHz. During wireless radiotelephone communications, processing of GPS signals can be suppressed when actively providing radiotelephone communications (including transmissions) with the space-based component and/or one of the ancillary terrestrial components. The use of separate low noise amplifiers, however, may allow the radiotelephone to receive signals from an SBN and/or ATN (such as control signals including call pages provided over control channels) during GPS mode operations.

During wireless radiotelephone communications, communications received at and/or transmitted from the terrestrial/satellite front end portion 2023 can be processed. During wireless radiotelephone communications, the wireless radiotelephone communications can be processed without significantly suppressing energy of the communications at and/or below (1575.42−Δ) MHz because the GPS filter 2022 is not in the receive path for terrestrial/satellite communications. As shown in FIG. 20, the terrestrial/satellite front end portion 2023 can include low noise amplifier 2033, a communications filter 2041, a transmitter 2043, and a duplexer 2045. The duplexor 2045 can provide coupling between the antenna 2007, the transmitter 2043, and the communications filter 2041. It will be understood that the communications filter 2041 may not be required in some embodiments wherein the duplexer itself provides adequate isolation between the communications transmitter and receiver. It will also be understood that in some embodiments where TDMA is the multiple access technique used for communications signal transmission and reception, the duplexer 2045 may be replaced by a transmit/receive switch.

Accordingly, received radiotelephone communications can be received through the antenna 2007, the duplexer 2045, the communications filter 2041, and the low noise amplifier 2033, and provided to the terrestrial/satellite signal processor portion 2027. Similarly, transmitted radiotelephone communications from the terrestrial/satellite signal processor portion 2027 can be provided to the terrestrial/satellite front end portion 2023, and transmitted through the transmitter 2043, the duplexer 2045, and the antenna 2007. As discussed above, the GPS front end portion 2021 and the GPS signal processor portion 2025 may provide GPS mode operations while signals are received through the terrestrial/satellite front end portion 2023 and the terrestrial/satellite signal processor portion 2027. It may be desirable, however, to suspend GPS mode operations while transmitting from the terrestrial/satellite front end portion 2015.

While two antennas are illustrated in FIG. 20, more or fewer antennas may be used according to additional embodiments of the present invention. For example, a single antenna may be used for both GPS and radiotelephone operations with one or more duplexers being used to couple the single antenna to respective filters and antennas. Alternately, separate antennas may be provided for GPS reception, radiotelephone reception, and radiotelephone transmission.

Figure 21:
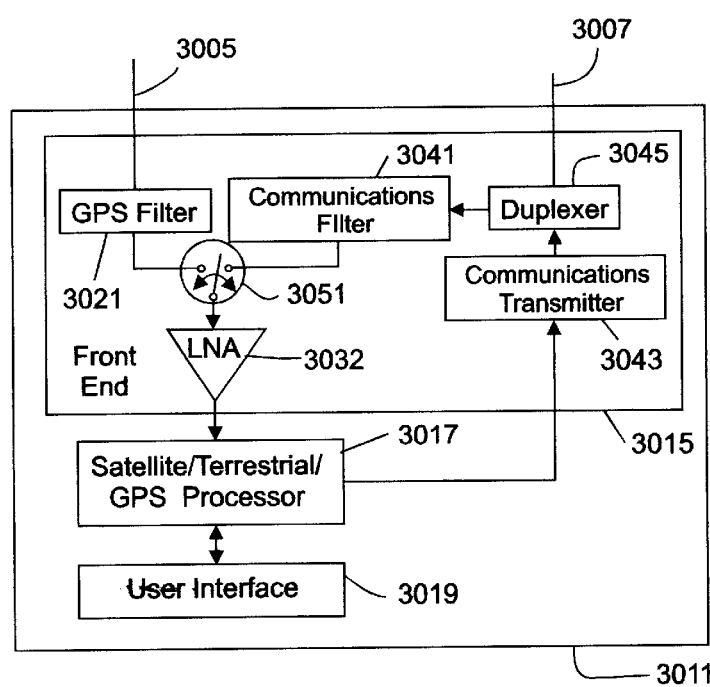

FIG. 21 illustrates radiotelephones according to still additional embodiments of the present invention. As shown, a radiotelephone 3011 can include a front end 3015, a signal processor 3017, a GPS antenna 3005, a terrestrial/satellite communications signal antenna 3007, and a user interface 3019. According to embodiments illustrated in FIG. 21, the front end 3015 can include a GPS filter 3021, a radiotelephone communications filter 3041, a duplexer 3045, and a transmitter 3043. In addition, a switch 3051 can be used to selectively couple either the GPS filter 3021 or the communications filter 3041 to a single low noise amplifier 3032. Accordingly, the radiotelephone 3011 does not receive GPS signals and radiotelephone signals at the same time.

During GPS operations, the switch 3051 couples the GPS filter 3021 to the low noise amplifier 3032, and decouples the communications filter 3041 from the low noise amplifier 3032. Accordingly, GPS signals can be received through GPS antenna 3005, the GPS filter 3021, the switch 3051, and the low noise amplifier 3032, and provided to the signal processor 3017. The signal processor 3017 can thus generate a measure of location of the radiotelephone 3011, and a measure of location can be provided to a user of the radiotelephone via user interface 3019. In addition, a measure of location of the radiotelephone can be transmitted through transmitter 3043 to the SBN and/or ATN and/or commands or other information from the SBN and/or ATN can be provided to the signal processor 3017.

During GPS mode operations, the GPS filter 3021 of the front end 3015 can selectively suppress energy received at frequencies at and/or below (1575.42−Δ) MHz, where 0<Δ≦16.42 MHz, and a measure of location of the radiotelephone can be determined using the GPS signals having suppressed energy at and/or below (1575.42−Δ) MHz. During GPS mode operations, selectively suppressing energy at and/or below (1575.42−Δ) MHz can include selectively suppressing at least 10 dB of energy at (1575.42−Δ) MHz and at frequencies less than (1575.42−Δ) MHz. During wireless radiotelephone communications, processing of GPS signals can be suppressed because the switch 3051 will decouple the GPS filter 3021 from the low noise amplifier 3032.

During wireless radiotelephone communications, communications received at and/or transmitted from the radiotelephone 3011 can be processed. During wireless radiotelephone communications, the wireless radiotelephone communications can be processed without significantly suppressing energy of the communications at and/or below (1575.42−Δ) MHz because the GPS filter 3021 is not in the receive path for terrestrial/satellite communications. As shown in FIG. 21, radiotelephone communications can be received through the antenna 3007, duplexer 3045, communications filter 3041, switch 3051, and low noise amplifier 3032, and provided to the signal processor 3017. Radiotelephone communications from the signal processor 3017 can be transmitted through the transmitter 3043, the duplexer 3045, and the antenna 3007. The duplexor 3045 can provide coupling between the antenna 3007, the transmitter 3043, and the communications filter 3041.

Accordingly, received radiotelephone communications can be received through the antenna 3007, the duplexer 3045, the communications filter 3041, and the low noise amplifier 3032, and provided to the signal processor 3017. Similarly, transmitted radiotelephone communications from the signal processor 3017 can be transmitted through the transmitter 3043, the duplexer 3045, and the antenna 3007. It will be understood that the communications filter 3041 may not be required in some embodiments wherein the duplexer itself provides adequate isolation between the communications transmitter and receiver. It will also be understood that in some embodiments where TDMA is the multiple access technique used for communications signal transmission and reception, the duplexer 3045 may be replaced by a transmit/receive switch.

While two antennas are illustrated in FIG. 21, more or fewer antennas may be used according to additional embodiments of the present invention. For example, a single antenna may be used for both GPS and radiotelephone operations with one or more duplexers being used to couple the single antenna to respective filters and antennas. Alternately, separate antennas may be provided for GPS reception, radiotelephone reception, and radiotelephone transmission.

In the drawings and specification, there have been disclosed typical preferred embodiments of the invention and, although specific terms are employed, they are used in a generic and descriptive sense only and not for purposes of limitation. While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A satellite radiotelephone system comprising:
   a space-based component that is configured to provide wireless radiotelephone communications using satellite radiotelephone frequencies;
   a plurality of ancillary terrestrial components including a plurality of ancillary terrestrial component antennas that are configured to provide wireless radiotelephone communications using at least one of the satellite radiotelephone frequencies in a radiation pattern that increases radiation below the horizon compared to above the horizon; and
   a plurality of radiotelephones that are configured to communicate with the space-based component and with the plurality of ancillary terrestrial components, the radiotelephones also including a GPS signal receiver and a GPS mode filter that is configured to suppress energy at and/or below (1575.42−Δ) MHz, where 0<Δ≦16.42 MHz.

2. The satellite radiotelephone system according to claim 1, wherein the GPS mode filter is configured to suppress at least 10 dB of energy at and/or below (1575.42−Δ) MHz.

3. The satellite radiotelephone system according to claim 2, wherein the GPS mode filter is configured to suppress at least 10 dB of energy at frequencies less than (1575.42−Δ) MHz.

4. The satellite radiotelephone system according to claim 1, wherein the GPS mode filter is configured to suppress at least 10 dB of energy at and below (1575.42−Δ) MHz.

5. The satellite radiotelephone system according to claim 1, wherein the radiotelephones are further configured to suppress processing of GPS signals when actively communicating with the space-based component and/or one of the ancillary terrestrial components.

6. The satellite radiotelephone system according to claim 5, wherein the GPS mode filter is coupled between an antenna and a low noise amplifier used in reception of GPS signals.

7. The satellite radiotelephone system according to claim 1, wherein the satellite radiotelephone frequencies comprise a satellite downlink frequency band and a satellite uplink frequency band and wherein GPS signals are transmitted from GPS satellites over a GPS frequency band between the satellite downlink and uplink frequency bands.

8. The satellite radiotelephone system according to claim 7, wherein the satellite downlink frequency band comprises frequencies between 1525 MHz and 1559 MHz, and wherein the satellite uplink frequency band comprises frequencies between 1626.5 MHz and 1660.5 MHz.

9. The satellite radiotelephone system according to claim 7, wherein the GPS frequency band comprises frequencies between 1559 MHz and 1605 MHz.

10. The satellite radiotelephone system according to claim 1, wherein Δ is greater than at least 1 MHz.

11. The satellite radiotelephone system according to claim 1, wherein the wireless radiotelephone communications are not subjected to the GPS mode filter.

12. The satellite radiotelephone system according to claim 1, wherein the GPS mode filter comprises a high pass filter.

13. The satellite radiotelephone system according to claim 1, wherein the radiotelephones are further configured to receive incoming call pages during GPS mode operations.

14. A radiotelephone comprising:
   a radio front end that is configured to provide wireless radiotelephone communications using radiotelephone frequencies, and that is configured to receive global positioning satellite (GPS) signals from a plurality of global positioning satellites;
   a signal processor that is configured to determine a measure of location of the radiotelephone using GPS signals received at the radio front end when providing GPS mode operations and that is configured to process communications that are received at and/or transmitted from the radio front end when providing wireless radiotelephone communications; and
   a GPS mode filter that is configured to filter GPS signals received at the radio front end before being provided to the signal processor, wherein the GPS mode filter is configured to suppress energy at and/or below (1575.42−Δ) MHz, where 0<Δ≦16.42 MHz.

15. The radiotelephone according to claim 14, wherein the radio front end is configured to provide radiotelephone communications with a space-based component using satellite radiotelephone frequencies and to provide wireless radiotelephone communications with a plurality of ancillary terrestrial components using at least one of the satellite radiotelephone frequencies.

16. The radiotelephone according to claim 14, wherein the wireless radiotelephone communications are not subjected to the GPS mode filter.

17. The radiotelephone according to claim 14, wherein the GPS mode filter is coupled between an antenna and a low noise amplifier used in reception of GPS signals.

18. The radiotelephone according to claim 14, wherein the GPS mode filter is configured to suppress at least 10 dB at (1575.42−Δ) MHz.

19. The radiotelephone according to claim 18, wherein the GPS mode filter is configured to suppress at least 10 dB of energy at frequencies less than (1575.42−Δ) MHz.

20. The radiotelephone according to claim 14, wherein processing of GPS signals at the signal processor is suppressed when actively providing radiotelephone communications with the space-based component and/or one of the ancillary terrestrial components.

21. The radiotelephone according to claim 14, wherein the satellite radiotelephone frequencies comprise a satellite downlink frequency band and a satellite uplink frequency band and wherein GPS signals are transmitted from GPS satellites over a GPS frequency band between the satellite downlink and uplink frequency bands.

22. The radiotelephone according to claim 21, wherein the satellite downlink frequency band comprises frequencies between 1525 MHz and 1559 MHz, and wherein the satellite uplink frequency band comprises frequencies between 1626.5 MHz and 1660.5 MHz.

23. The radiotelephone according to claim 21, wherein the GPS frequency band comprises frequencies between 1559 MHz and 1605 MHz.

24. The radiotelephone according to claim 14, wherein Δ is greater than at least 1 MHz.

25. The radiotelephone according to claim 14, wherein the GPS mode filter comprises a high pass filter.

26. The radiotelephone according to claim 14, wherein the radio front end is further configured to receive incoming call pages during GPS mode operations and wherein the signal processor is further configured to process incoming call pages during GPS operations.

27. A method of providing radiotelephone communications at a radiotelephone comprising a radio front end that is configured to provide wireless radiotelephone communications using radiotelephone frequencies, and that is configured to receive global positioning satellite (GPS) signals from a plurality of Global positioning satellites, the method comprising:

during GPS mode operations, suppressing energy at and/or below (1575.42−Δ) MHz for GPS signals received from the radio front end, where 0<Δ≦16.42 MHz;

during GPS mode operations, determining a measure of location of the radiotelephone using the GPS signals having suppressed energy at and/or below (1575.42−Δ) MHz; and during wireless radiotelephone communications, processing communications that are received at and/or transmitted from the radio front end.

28. The method according to claim 27, wherein the radio front end is configured to provide wireless radiotelephone communications with a space-based component using satellite radiotelephone frequencies and to provide wireless radiotelephone communications with a plurality of ancillary terrestrial components using at least one of the satellite radiotelephone frequencies.

29. The method according to claim 27, wherein processing communications that are received at and transmitted from the radio front end during wireless radiotelephone communications comprises processing the communications without suppressing energy of the communications at and/or below (1575.42−Δ) MHz.

30. The method according to claim 27, wherein suppressing energy at and/or below (1575.42−Δ) MHz comprises suppressing at least 10 dB of energy at and/or below (1575.42−Δ) MHz.

31. The method according to claim 30, wherein suppressing energy at and/or (1575.42−Δ) MHz comprises suppressing at least 10 dB of energy at frequencies less than (1575.42−Δ) MHz.

32. The method according to claim 31, wherein suppressing energy at and/or below (1575.42−Δ) MHz comprises suppressing at least 10 dB of energy at (1575.42−Δ) MHz and at frequencies less than (1575.42−Δ) MHz.

33. The method according to claim 27, wherein processing of GPS signals is suppressed when actively providing radiotelephone communications with the space-based component and/or one of the ancillary terrestrial components.

34. The method according to claim 28, wherein the satellite radiotelephone frequencies comprise a satellite downlink frequency band and a satellite uplink frequency band and wherein GPS signals are transmitted from GPS satellites over a GPS frequency band between the satellite downlink and uplink frequency bands.

35. The method according to claim 34, wherein the satellite downlink frequency band comprises frequencies between 1525 MHz and 1559 MHz, and wherein the satellite uplink frequency band comprises frequencies between 1626.5 MHz and 1660.5 MHz.

36. The method according to claim 34, wherein the GPS frequency band comprises frequencies between 1559 MHz and 1605 MHz.

37. The method according to claim 27, wherein Δ is greater than at least 1 MHz.

38. The method according to claim 27, further comprising:

receiving an incoming call page during GPS mode operations; and processing the incoming call page during GPS operations.

39. The method according to claim 27, further comprising:

during GPS mode operations prior to determining the measure of location, providing low noise amplification of the GPS signals having suppressed energy at and/or below (1575.42−Δ) MHz.

* * * * *

UNITED STATES PATENT AND TRADEMARK OFFICE
CERTIFICATE OF CORRECTION

PATENT NO. : 6,785,543 B2
DATED : August 31, 2004
INVENTOR(S) : Karabinis

It is certified that error appears in the above-identified patent and that said Letters Patent is hereby corrected as shown below:

Title page,
Item [56], References Cited, U.S. PATENT DOCUMENTS, include the following:
-- 6,374,094    4/2002    Zappala    455/188.1 --
FOREIGN PATENT DOCUMENTS, include the following:
-- EP    1 152 254    11/2001    G01S/5/14 --
OTHER PUBLICATIONS, include the following:
-- PCT International Search Report for PCT/US 03/12701. --

Signed and Sealed this

Twenty-second Day of March, 2005

JON W. DUDAS
*Director of the United States Patent and Trademark Office*